United States Patent
Miller et al.

(10) Patent No.: US 10,072,510 B2
(45) Date of Patent: Sep. 11, 2018

(54) VARIABLE PITCH FAN FOR GAS TURBINE ENGINE AND METHOD OF ASSEMBLING THE SAME

(71) Applicant: General Electric Company, Schenectady, NY (US)

(72) Inventors: Brandon Wayne Miller, Middletown, OH (US); Ian Francis Prentice, Cincinnati, OH (US); Daniel Alan Niergarth, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 21 days.

(21) Appl. No.: 14/873,382

(22) Filed: Oct. 2, 2015

(65) Prior Publication Data

US 2016/0146025 A1 May 26, 2016

Related U.S. Application Data

(60) Provisional application No. 62/082,875, filed on Nov. 21, 2014.

(51) Int. Cl.
*F01D 7/00* (2006.01)
*F01D 25/24* (2006.01)
(Continued)

(52) U.S. Cl.
CPC ............... *F01D 7/00* (2013.01); *F01D 5/02* (2013.01); *F01D 7/02* (2013.01); *F01D 9/041* (2013.01);
(Continued)

(58) Field of Classification Search
CPC ..... F01D 1/30; F01D 7/00; F01D 5/02; F01D 5/30; F01D 5/3007; F01D 5/3023;
(Continued)

(56) References Cited

U.S. PATENT DOCUMENTS

| 493,623 A | 3/1893 | Harris |
|---|---|---|
| 1,951,321 A | 3/1934 | Blanchard |

(Continued)

FOREIGN PATENT DOCUMENTS

| CA | 2241940 A1 | 7/1997 |
|---|---|---|
| CA | 2414992 A1 | 9/2003 |

(Continued)

OTHER PUBLICATIONS

European Search Report and Written Opinion issued in connection with corresponding EP Application No. 15195349.4-1610 dated Mar. 21, 2016.
(Continued)

*Primary Examiner* — Jason Shanske
*Assistant Examiner* — Alexander White
(74) *Attorney, Agent, or Firm* — General Electric Company; Pamela Kachur (57) ABSTRACT

A gas turbine engine is provided. The gas turbine engine includes a core and a variable pitch fan arranged in flow communication with the core. The variable pitch fan has a disk and at least nine fan blades coupled to the disk for rotation together with the disk. The gas turbine engine further includes a rotatable nacelle covering the disk such that the engine has a fan hub radius ratio of between about 0.1 and about 0.4.

18 Claims, 7 Drawing Sheets

(51) Int. Cl.
  *F01D 9/04* (2006.01)
  *F01D 17/10* (2006.01)
  *F02C 3/04* (2006.01)
  *F01D 5/02* (2006.01)
  *F01D 7/02* (2006.01)
  *F04D 29/32* (2006.01)

(52) U.S. Cl.
  CPC ........... *F01D 17/105* (2013.01); *F01D 25/24* (2013.01); *F02C 3/04* (2013.01); *F04D 29/323* (2013.01); *F05D 2220/32* (2013.01); *F05D 2220/36* (2013.01); *F05D 2240/35* (2013.01); *F05D 2260/71* (2013.01); *F05D 2260/74* (2013.01)

(58) Field of Classification Search
  CPC ........ F01D 9/041; F01D 17/105; F01D 25/24; F02C 3/04; F05D 2220/32; F05D 2240/35; F05D 2260/70; F05D 2260/74; F05D 2260/79; B64C 11/00; B64C 11/06; B64C 11/30; B64C 11/32; B64C 11/34; B64C 11/343; B64C 11/346; B64C 11/36; B64C 11/38; B64C 11/385; B64C 11/40; B64C 11/42; B64C 11/44
  USPC ......... 415/129, 130, 160, 218.1; 416/26, 27, 416/46, 147, 153
  See application file for complete search history.

(56) References Cited

U.S. PATENT DOCUMENTS

| | | |
|---|---|---|
| 2,177,315 A | 10/1939 | Caria |
| 2,353,334 A | 7/1944 | Haugh |
| 2,417,406 A | 3/1947 | Burkhalter |
| 2,518,431 A | 8/1950 | Wildhaber |
| 2,566,696 A | 9/1951 | Cushman |
| 2,648,391 A | 8/1953 | Cushman et al. |
| 2,665,055 A * | 1/1954 | Adams, Jr. ............... F04D 29/36 415/129 |
| 2,955,656 A | 10/1960 | Balje et al. |
| 3,560,110 A | 2/1971 | Cornell |
| 3,781,131 A | 12/1973 | McMurtry |
| 3,922,852 A | 12/1975 | Drabek |
| 3,988,889 A | 11/1976 | Chamay et al. |
| 3,994,128 A * | 11/1976 | Griswold, Jr. ........ F04D 29/323 416/153 |
| 4,141,664 A | 2/1979 | Moran et al. |
| 4,411,596 A | 10/1983 | Chilman |
| 4,578,019 A | 3/1986 | Safarik |
| 4,671,737 A | 6/1987 | Whitehouse |
| 4,704,862 A | 11/1987 | Dennison et al. |
| 4,913,623 A | 4/1990 | Schilling et al. |
| 4,936,748 A | 6/1990 | Adamson et al. |
| 4,969,325 A | 11/1990 | Adamson et al. |
| 4,976,102 A | 12/1990 | Taylor |
| 5,010,729 A | 4/1991 | Adamson et al. |
| 5,015,150 A | 5/1991 | Rohra |
| 5,257,907 A | 11/1993 | Seidel |
| 5,263,898 A * | 11/1993 | Elston, III ............... B64C 11/06 416/129 |
| 5,284,418 A | 2/1994 | Moriya |
| 5,431,539 A | 7/1995 | Carvalho |
| 5,501,575 A | 3/1996 | Eldredge et al. |
| 5,529,263 A | 6/1996 | Rudolph |
| 5,542,357 A | 8/1996 | Gerhardt |
| 5,562,417 A | 10/1996 | Grimm et al. |
| 5,617,719 A | 4/1997 | Ginter |
| 5,630,701 A | 5/1997 | Lawer |
| 5,727,757 A | 3/1998 | Nyhus |
| 5,743,080 A | 4/1998 | Ginter |
| 5,779,446 A | 7/1998 | Althof et al. |
| 5,810,555 A | 9/1998 | Savage et al. |
| 5,897,293 A | 4/1999 | Arel et al. |
| 5,904,320 A | 5/1999 | Tindell |
| 5,931,636 A | 8/1999 | Savage et al. |
| 5,967,461 A | 10/1999 | Farrington |
| 5,974,882 A | 11/1999 | Heath |
| 5,977,677 A | 11/1999 | Henry et al. |
| 5,988,307 A | 11/1999 | Yamada et al. |
| 6,000,635 A | 12/1999 | Justice |
| 6,027,383 A | 2/2000 | Broinowski |
| 6,071,077 A | 6/2000 | Rowlands |
| 6,112,512 A | 9/2000 | Miller et al. |
| 6,112,513 A | 9/2000 | Catt et al. |
| 6,112,523 A | 9/2000 | Kamo et al. |
| 6,148,605 A | 11/2000 | Lardellier |
| 6,158,894 A | 12/2000 | Pujari et al. |
| 6,173,908 B1 | 1/2001 | Bureaux et al. |
| 6,195,981 B1 | 3/2001 | Hanley et al. |
| 6,226,974 B1 | 5/2001 | Andrew et al. |
| 6,247,311 B1 | 6/2001 | Itoyama et al. |
| 6,260,794 B1 | 7/2001 | Rowe |
| 6,270,309 B1 | 8/2001 | Ghetzler et al. |
| 6,276,127 B1 | 8/2001 | Alberti |
| 6,289,666 B1 | 9/2001 | Ginter |
| 6,292,763 B1 | 9/2001 | Dunbar et al. |
| 6,308,740 B1 | 10/2001 | Smith et al. |
| 6,314,721 B1 | 11/2001 | Mathews et al. |
| 6,324,828 B1 | 12/2001 | Willis et al. |
| 6,332,313 B1 | 12/2001 | Willis et al. |
| 6,332,754 B1 | 12/2001 | Matsuda et al. |
| 6,349,682 B1 | 2/2002 | Alexius |
| 6,386,830 B1 | 5/2002 | Slipper et al. |
| 6,416,015 B1 | 7/2002 | Carson |
| 6,431,146 B1 | 8/2002 | Alexius et al. |
| 6,439,840 B1 | 8/2002 | Tse |
| 6,450,369 B1 | 9/2002 | Heyes |
| 6,464,459 B2 | 10/2002 | Illingworth |
| 6,499,286 B1 | 12/2002 | Zakharov et al. |
| 6,516,603 B1 | 2/2003 | Urbach et al. |
| 6,520,286 B1 | 2/2003 | Frederiksen et al. |
| 6,543,998 B1 | 4/2003 | Scharl |
| 6,557,503 B2 | 5/2003 | Hampson |
| 6,557,799 B1 | 5/2003 | Sternberger |
| 6,564,556 B2 | 5/2003 | Ginter |
| 6,565,334 B1 | 5/2003 | Bradbury et al. |
| 6,584,849 B2 | 7/2003 | Loftus et al. |
| 6,619,030 B1 | 9/2003 | Seda et al. |
| 6,647,708 B2 | 11/2003 | Bornhoft et al. |
| 6,651,439 B2 | 11/2003 | Al-Roub et al. |
| 6,681,557 B2 | 1/2004 | Wilson |
| 6,687,596 B2 | 2/2004 | Humerickhouse et al. |
| 6,691,515 B2 | 2/2004 | Verdouw et al. |
| 6,708,905 B2 | 3/2004 | McCoy et al. |
| 6,722,847 B2 * | 4/2004 | Freeman ............... B64C 11/001 415/119 |
| 6,732,502 B2 | 5/2004 | Seda et al. |
| 6,749,395 B1 | 6/2004 | Reichert et al. |
| 6,802,185 B2 | 10/2004 | Furukawa et al. |
| 6,802,695 B2 | 10/2004 | Haller |
| 6,820,431 B2 | 11/2004 | McManus et al. |
| 6,866,610 B2 | 3/2005 | Ito |
| 6,885,129 B1 | 4/2005 | Oohashi et al. |
| 6,885,917 B2 | 4/2005 | Osder et al. |
| 6,901,738 B2 | 6/2005 | Sammann et al. |
| 6,942,453 B2 | 9/2005 | Tsuru et al. |
| 6,942,458 B2 | 9/2005 | McCallum et al. |
| 6,962,044 B1 | 11/2005 | Miller et al. |
| 6,964,170 B2 | 11/2005 | Alkabie |
| 6,969,235 B2 | 11/2005 | Feest |
| 6,981,365 B1 | 1/2006 | Johnson |
| 7,007,483 B2 | 3/2006 | Peters |
| 7,043,900 B2 | 5/2006 | Shirakawa et al. |
| 7,047,724 B2 | 5/2006 | Nordeen et al. |
| 7,048,206 B2 | 5/2006 | Walti et al. |
| 7,055,329 B2 | 6/2006 | Martens et al. |
| 7,083,773 B2 | 8/2006 | Kwon et al. |
| 7,100,360 B2 | 9/2006 | Sammann et al. |
| 7,100,868 B2 | 9/2006 | Stephan |
| RE39,479 E | 1/2007 | Tressler et al. |
| 7,189,059 B2 | 3/2007 | Barton et al. |
| 7,204,676 B2 | 4/2007 | Dutton et al. |

(56) References Cited

U.S. PATENT DOCUMENTS

| | | |
|---|---|---|
| 7,252,478 B2 | 8/2007 | Aynsley |
| 7,254,951 B2 | 8/2007 | Lockwood et al. |
| 7,278,256 B2 | 10/2007 | Norris et al. |
| 7,293,401 B2 | 11/2007 | Papamoschou |
| 7,306,434 B2 | 12/2007 | Goldfinch et al. |
| 7,308,966 B2 | 12/2007 | Gupta |
| 7,310,951 B2 | 12/2007 | Kasahara |
| 7,318,619 B2 | 1/2008 | Munro et al. |
| 7,320,748 B2 | 1/2008 | Hemighaus et al. |
| 7,334,392 B2 | 2/2008 | Moniz et al. |
| 7,341,225 B2 | 3/2008 | Stretton et al. |
| 7,395,188 B1 | 7/2008 | Goebel et al. |
| 7,399,377 B2 | 7/2008 | Crane et al. |
| 7,406,826 B2 | 8/2008 | Hayashi et al. |
| 7,424,413 B2 | 9/2008 | Brooke et al. |
| 7,437,877 B2 | 10/2008 | Kawamoto et al. |
| 7,451,592 B2 | 11/2008 | Taylor et al. |
| 7,472,543 B2 | 1/2009 | Papamoschou |
| 7,503,750 B1 | 3/2009 | Violette |
| 7,510,371 B2 | 3/2009 | Orlando et al. |
| 7,513,102 B2 | 4/2009 | Moniz et al. |
| 7,520,124 B2 | 4/2009 | Narayanan et al. |
| 7,543,452 B2 | 6/2009 | Reba et al. |
| 7,549,293 B2 | 6/2009 | Gallagher et al. |
| 7,559,749 B2 | 7/2009 | Kidikian et al. |
| 7,568,890 B2 | 8/2009 | Findlay et al. |
| 7,591,130 B2 | 9/2009 | Ito |
| 7,600,368 B2 | 10/2009 | Lockwood et al. |
| 7,600,371 B2 | 10/2009 | Sternberger |
| 7,608,181 B2 | 10/2009 | O'Rear |
| 7,622,817 B2 | 11/2009 | El-Refaie et al. |
| 7,624,565 B2 | 12/2009 | Murrow et al. |
| 7,624,567 B2 | 12/2009 | Peters et al. |
| 7,625,128 B2 | 12/2009 | Gillespie |
| 7,625,183 B2 | 12/2009 | Tsifourdaris et al. |
| 7,631,484 B2 | 12/2009 | Giffin et al. |
| 7,637,716 B2 | 12/2009 | Benton |
| 7,681,398 B2 | 3/2010 | Patel et al. |
| 7,726,113 B2 | 6/2010 | Orlando et al. |
| 7,735,601 B1 | 6/2010 | Stieger et al. |
| 7,753,036 B2 | 7/2010 | Lents et al. |
| 7,788,898 B2 | 9/2010 | Kern et al. |
| 7,791,235 B2 | 9/2010 | Kern et al. |
| 7,801,669 B2 | 9/2010 | Nagae |
| 7,806,651 B2 | 10/2010 | Kennepohl et al. |
| 7,818,970 B2 | 10/2010 | Price et al. |
| 7,861,580 B2 | 1/2011 | Sujan et al. |
| 7,861,967 B2 | 1/2011 | Karem |
| 7,863,767 B2 | 1/2011 | Chapple et al. |
| 7,877,980 B2 | 2/2011 | Johnson |
| 7,878,130 B2 | 2/2011 | Yamamoto et al. |
| 7,901,657 B2 | 3/2011 | Arpac et al. |
| 7,918,090 B2 | 4/2011 | Suzuki et al. |
| 7,918,608 B2 | 4/2011 | Braun |
| 7,918,646 B2 | 4/2011 | Akcasu |
| 7,934,368 B2 | 5/2011 | Muller et al. |
| 7,963,364 B2 | 6/2011 | Nadler et al. |
| 7,967,924 B2 * | 6/2011 | Groh ............... B22F 3/004 148/410 |
| 7,980,810 B2 | 7/2011 | Unno |
| 7,984,607 B2 | 7/2011 | Sharma et al. |
| 8,014,929 B2 | 9/2011 | Page et al. |
| 8,051,830 B2 | 11/2011 | Taylor |
| 8,055,435 B2 | 11/2011 | Okumura et al. |
| 8,057,187 B2 | 11/2011 | Demania et al. |
| 8,065,874 B2 | 11/2011 | Fong et al. |
| 8,074,440 B2 | 12/2011 | Kohlenberg et al. |
| 8,074,924 B2 | 12/2011 | Cros |
| 8,075,270 B2 | 12/2011 | Violette et al. |
| 8,075,272 B2 | 12/2011 | Riaz et al. |
| 8,087,251 B2 | 1/2012 | Iwasaki et al. |
| 8,087,870 B2 | 1/2012 | Flucker et al. |
| 8,089,173 B2 | 1/2012 | Freda |
| 8,092,150 B2 | 1/2012 | Rofka et al. |
| 8,096,123 B2 | 1/2012 | Liu et al. |
| 8,096,775 B2 | 1/2012 | Riaz et al. |
| 8,100,657 B2 | 1/2012 | Riaz et al. |
| 8,100,665 B2 | 1/2012 | De Filippis et al. |
| 8,100,671 B2 | 1/2012 | Botros et al. |
| 8,122,724 B2 | 2/2012 | Slovisky et al. |
| RE43,252 E | 3/2012 | Ginter |
| 8,127,528 B2 | 3/2012 | Roberge |
| 8,133,027 B2 | 3/2012 | Carvalho et al. |
| 8,205,827 B2 | 6/2012 | Kerrebrock et al. |
| 8,210,796 B2 | 7/2012 | Hernandez et al. |
| 8,220,443 B2 | 7/2012 | Murata et al. |
| 8,225,593 B2 | 7/2012 | Le Hong et al. |
| 8,261,527 B1 | 9/2012 | Stearns et al. |
| 8,262,358 B1 | 9/2012 | Muylaert et al. |
| 8,276,360 B2 | 10/2012 | Poisson et al. |
| 8,277,174 B2 | 10/2012 | Hasel et al. |
| 8,286,414 B2 | 10/2012 | Gallagher et al. |
| 8,302,397 B2 | 11/2012 | Liu et al. |
| 8,308,423 B2 | 11/2012 | Berryann et al. |
| 8,308,426 B2 | 11/2012 | Cigal et al. |
| 8,316,646 B2 | 11/2012 | Baran |
| 8,337,149 B1 | 12/2012 | Hasel et al. |
| 8,365,513 B2 | 2/2013 | McVey |
| 8,365,515 B2 | 2/2013 | Migliaro, Jr. |
| 8,366,382 B1 | 2/2013 | Muldoon et al. |
| 8,366,385 B2 | 2/2013 | Davis et al. |
| 8,376,696 B2 | 2/2013 | Suzuki et al. |
| 8,382,430 B2 | 2/2013 | Parry et al. |
| 8,387,570 B2 | 3/2013 | Firey |
| 8,413,418 B2 | 4/2013 | Mason et al. |
| 8,418,436 B2 | 4/2013 | Pero et al. |
| 8,418,953 B2 | 4/2013 | Smith et al. |
| 8,418,964 B2 | 4/2013 | Leblanc et al. |
| 8,424,313 B1 | 4/2013 | Praisner et al. |
| 8,439,637 B2 | 5/2013 | Dibenedetto et al. |
| 8,443,582 B1 | 5/2013 | Phillips et al. |
| 8,443,586 B2 | 5/2013 | Schwark, Jr. et al. |
| 8,448,451 B2 | 5/2013 | Nakamura et al. |
| 8,448,895 B2 | 5/2013 | Suciu et al. |
| 8,449,247 B1 | 5/2013 | Hasel et al. |
| 8,453,458 B2 | 6/2013 | Whurr et al. |
| 8,459,035 B2 | 6/2013 | Smith et al. |
| 8,460,779 B2 | 6/2013 | Gupta et al. |
| 8,468,797 B2 | 6/2013 | Sharma |
| 8,499,626 B2 | 8/2013 | Greciet et al. |
| 8,511,061 B1 | 8/2013 | Merry et al. |
| 8,511,066 B2 | 8/2013 | Harris et al. |
| 8,511,604 B2 | 8/2013 | Suciu |
| 8,511,605 B2 | 8/2013 | Suciu et al. |
| 8,511,987 B2 | 8/2013 | Reinhardt et al. |
| 8,512,190 B2 | 8/2013 | De Maziere |
| 8,517,302 B2 | 8/2013 | Karem |
| 8,517,665 B2 | 8/2013 | Lugo et al. |
| 8,529,192 B2 | 9/2013 | Beers et al. |
| 8,539,749 B1 | 9/2013 | Wichmann et al. |
| 8,544,793 B1 | 10/2013 | Shammoh |
| 8,561,414 B1 | 10/2013 | Praisner et al. |
| 8,561,581 B2 | 10/2013 | Taylor |
| 8,562,284 B2 | 10/2013 | Bradbrook |
| 8,567,192 B2 | 10/2013 | Chi et al. |
| 8,572,943 B1 | 11/2013 | Sheridan |
| 8,579,225 B2 | 11/2013 | Mardjono et al. |
| 8,601,786 B2 | 12/2013 | Hurwitz et al. |
| 8,606,543 B2 | 12/2013 | Naslund et al. |
| 8,622,687 B2 | 1/2014 | Giffin et al. |
| 8,622,697 B2 | 1/2014 | Bortoli et al. |
| 8,632,301 B2 | 1/2014 | Topol et al. |
| 8,640,457 B2 | 2/2014 | Gokhale et al. |
| 8,646,251 B2 | 2/2014 | Rosenkrans et al. |
| 8,646,721 B2 | 2/2014 | Chapman et al. |
| 8,662,052 B2 | 3/2014 | Garside |
| 8,668,434 B2 | 3/2014 | Karpman et al. |
| 8,668,463 B2 | 3/2014 | Yilmaz |
| 8,678,743 B1 | 3/2014 | Sheridan et al. |
| 8,684,303 B2 | 4/2014 | Suciu et al. |
| 8,687,206 B2 | 4/2014 | Hockaday |
| 8,695,324 B2 | 4/2014 | Giffin et al. |
| 8,695,920 B2 | 4/2014 | Suciu et al. |
| 8,702,381 B2 | 4/2014 | Alajbegovic et al. |

(56) References Cited

U.S. PATENT DOCUMENTS

| | | |
|---|---|---|
| 8,708,256 B2 | 4/2014 | Kobayashi |
| 8,708,640 B2 | 4/2014 | Power et al. |
| 8,708,643 B2 | 4/2014 | Giffin et al. |
| 8,708,863 B2 | 4/2014 | McCune et al. |
| 8,713,910 B2 | 5/2014 | Stuart et al. |
| 8,714,913 B2 | 5/2014 | Topol et al. |
| 8,727,267 B2 | 5/2014 | Jain et al. |
| 8,734,095 B2 | 5/2014 | Iida |
| 8,747,054 B2 | 6/2014 | Witlicki |
| 8,753,065 B2 | 6/2014 | Sheridan et al. |
| 8,769,962 B2 | 7/2014 | Glahn et al. |
| 8,777,793 B2 | 7/2014 | Sheridan |
| 8,793,971 B2 | 8/2014 | Dyer et al. |
| 8,794,009 B2 | 8/2014 | Glahn et al. |
| 8,794,542 B1 | 8/2014 | Hunter et al. |
| 8,794,846 B2 | 8/2014 | Hashish |
| 8,794,910 B2 | 8/2014 | Gasmen et al. |
| 8,800,261 B2 | 8/2014 | Hall et al. |
| 8,800,914 B2 | 8/2014 | Suciu et al. |
| 8,806,850 B2 | 8/2014 | Winter et al. |
| 8,807,477 B2 | 8/2014 | Suciu et al. |
| 8,807,916 B2 | 8/2014 | Sheridan et al. |
| 8,807,921 B2 | 8/2014 | Struziak |
| 8,814,494 B1 | 8/2014 | Sheridan et al. |
| 8,814,502 B2 | 8/2014 | Eleftheriou |
| 8,814,510 B2 | 8/2014 | Colson et al. |
| 8,820,090 B2 | 9/2014 | Lee et al. |
| 8,820,091 B2 | 9/2014 | Tham et al. |
| 8,827,203 B2 | 9/2014 | Balk |
| 8,827,639 B2 | 9/2014 | Beers et al. |
| 8,833,086 B2 | 9/2014 | Parnin et al. |
| 8,834,028 B2 | 9/2014 | Winkler et al. |
| 8,834,095 B2 | 9/2014 | Davis |
| 8,834,099 B1 | 9/2014 | Topol et al. |
| 8,839,627 B2 | 9/2014 | Eastwood et al. |
| 8,840,375 B2 | 9/2014 | Virkler |
| 8,844,257 B2 | 9/2014 | Parnin et al. |
| 8,844,265 B2 | 9/2014 | Adams |
| 8,850,793 B2 | 10/2014 | Adams et al. |
| 8,851,419 B2 | 10/2014 | Cottet |
| 8,851,754 B2 | 10/2014 | Dettmar et al. |
| 8,857,149 B1 | 10/2014 | Muldoon |
| 8,857,193 B2 | 10/2014 | Thies |
| 8,858,388 B2 | 10/2014 | McCune et al. |
| 8,863,491 B2 | 10/2014 | Merry et al. |
| 8,863,529 B2 | 10/2014 | Starr |
| 8,864,062 B2 | 10/2014 | Karem |
| 9,090,336 B2 | 7/2015 | Gallet |
| 2002/0124991 A1 | 9/2002 | Wilson |
| 2002/0162394 A1 | 11/2002 | Loftus et al. |
| 2003/0163983 A1 | 9/2003 | Seda et al. |
| 2003/0163984 A1 | 9/2003 | Seda et al. |
| 2003/0215330 A1 | 11/2003 | Haller |
| 2004/0123583 A1 | 7/2004 | Nordeen et al. |
| 2004/0129392 A1 | 7/2004 | Crane et al. |
| 2004/0261396 A1 | 12/2004 | Sammann et al. |
| 2005/0000205 A1 | 1/2005 | Sammann et al. |
| 2005/0068232 A1 | 3/2005 | Smith et al. |
| 2005/0178105 A1 | 8/2005 | Kawamoto et al. |
| 2005/0241292 A1 | 11/2005 | Taylor et al. |
| 2005/0276693 A1 | 12/2005 | Liu |
| 2006/0024162 A1 | 2/2006 | Giffin |
| 2006/0090451 A1 | 5/2006 | Moniz et al. |
| 2006/0096293 A1 | 5/2006 | Norris et al. |
| 2006/0272314 A1 | 12/2006 | Moniz et al. |
| 2006/0275111 A1 | 12/2006 | Orlando et al. |
| 2007/0084186 A1 | 4/2007 | Orlando et al. |
| 2007/0130959 A1 | 6/2007 | Linet et al. |
| 2007/0157595 A1 | 7/2007 | Lockwood et al. |
| 2008/0014079 A1 | 1/2008 | Lockwood et al. |
| 2008/0022691 A1 | 1/2008 | Kennepohl et al. |
| 2008/0056894 A1 | 3/2008 | Tsifourdaris et al. |
| 2008/0089630 A1 | 4/2008 | Glueck |
| 2008/0098713 A1 | 5/2008 | Orlando et al. |
| 2008/0118360 A1 | 5/2008 | Findlay et al. |
| 2008/0124221 A1 | 5/2008 | Kidikian et al. |
| 2008/0138195 A1 | 6/2008 | Kern et al. |
| 2008/0140352 A1 | 6/2008 | Goebel et al. |
| 2008/0143108 A1 | 6/2008 | El-Refaie et al. |
| 2008/0149445 A1 | 6/2008 | Kern et al. |
| 2008/0155961 A1 | 7/2008 | Johnson |
| 2008/0273969 A1 | 11/2008 | Murrow et al. |
| 2008/0283676 A1 | 11/2008 | Jain et al. |
| 2009/0016870 A1 | 1/2009 | Ishikawajima |
| 2009/0068003 A1 | 3/2009 | Sharma et al. |
| 2009/0112535 A1 | 4/2009 | Phillips |
| 2009/0133381 A1 | 5/2009 | Holmes et al. |
| 2009/0199536 A1 | 8/2009 | Bulin et al. |
| 2009/0211221 A1 | 8/2009 | Roberge |
| 2009/0257878 A1 | 10/2009 | Hernandez et al. |
| 2009/0314082 A1 | 12/2009 | Sujan et al. |
| 2010/0000222 A1 | 1/2010 | Price et al. |
| 2010/0019101 A1 | 1/2010 | Smith et al. |
| 2010/0034659 A1 | 2/2010 | Fujimura |
| 2010/0058769 A1 | 3/2010 | Baran |
| 2010/0061856 A1 | 3/2010 | Demania et al. |
| 2010/0061860 A1 | 3/2010 | Riaz et al. |
| 2010/0061861 A1 | 3/2010 | Riaz et al. |
| 2010/0089019 A1 | 4/2010 | Knight et al. |
| 2010/0092295 A1 | 4/2010 | Riaz et al. |
| 2010/0154761 A1 | 6/2010 | Okumura et al. |
| 2010/0192595 A1 | 8/2010 | Orlando et al. |
| 2010/0193644 A1 | 8/2010 | Karem |
| 2010/0280730 A1 | 11/2010 | Page et al. |
| 2010/0300087 A1 | 12/2010 | Liu et al. |
| 2010/0305011 A1 | 12/2010 | Frapin et al. |
| 2010/0326753 A1 | 12/2010 | Garside |
| 2011/0004388 A1 | 1/2011 | Winter |
| 2011/0036086 A1 | 2/2011 | Liu et al. |
| 2011/0036955 A1 | 2/2011 | Karem |
| 2011/0052370 A1 | 3/2011 | Karpman et al. |
| 2011/0061381 A1 | 3/2011 | Harris et al. |
| 2011/0076158 A1 | 3/2011 | Giffin et al. |
| 2011/0083641 A1 | 4/2011 | Gokhale et al. |
| 2011/0092726 A1 | 4/2011 | Clarke |
| 2011/0118071 A1 | 5/2011 | De Maziere |
| 2011/0120082 A1 | 5/2011 | Giffin et al. |
| 2011/0167784 A1 | 7/2011 | Johnson et al. |
| 2011/0167791 A1 | 7/2011 | Johnson et al. |
| 2011/0167792 A1 | 7/2011 | Johnson et al. |
| 2011/0167831 A1 | 7/2011 | Johnson |
| 2011/0171007 A1 | 7/2011 | Johnson et al. |
| 2011/0189003 A1 | 8/2011 | Iida |
| 2011/0243719 A1 | 10/2011 | Murphy et al. |
| 2011/0247343 A1 | 10/2011 | Sharma et al. |
| 2011/0268578 A1 | 11/2011 | Praisner et al. |
| 2011/0277448 A1 | 11/2011 | Roberts |
| 2011/0286842 A1 | 11/2011 | Danielson et al. |
| 2011/0288744 A1 | 11/2011 | Gokhale et al. |
| 2011/0290483 A1 | 12/2011 | Zornes |
| 2012/0011825 A1 | 1/2012 | Hall et al. |
| 2012/0036843 A1 | 2/2012 | Schertz et al. |
| 2012/0045334 A1 | 2/2012 | Bouru et al. |
| 2012/0056034 A1 | 3/2012 | Kosheleff |
| 2012/0073263 A1 | 3/2012 | Kohlenberg et al. |
| 2012/0085861 A1 | 4/2012 | Mardjono et al. |
| 2012/0087780 A1 | 4/2012 | Suciu et al. |
| 2012/0096853 A1 | 4/2012 | Taylor |
| 2012/0097801 A1 | 4/2012 | Barrett et al. |
| 2012/0110979 A1 | 5/2012 | Rosenkrans et al. |
| 2012/0117940 A1 | 5/2012 | Winter |
| 2012/0117975 A1 | 5/2012 | Sharma et al. |
| 2012/0121390 A1 | 5/2012 | Suciu et al. |
| 2012/0152007 A1 | 6/2012 | Holmes et al. |
| 2012/0171018 A1 | 7/2012 | Hasel et al. |
| 2012/0174593 A1 | 7/2012 | Sharma et al. |
| 2012/0198815 A1 | 8/2012 | Suciu et al. |
| 2012/0198816 A1 | 8/2012 | Suciu et al. |
| 2012/0198817 A1 | 8/2012 | Suciu et al. |
| 2012/0210710 A1 | 8/2012 | Chevalier et al. |
| 2012/0210711 A1 | 8/2012 | Petrovic et al. |
| 2012/0222397 A1 | 9/2012 | Smith et al. |
| 2012/0222398 A1 | 9/2012 | Smith et al. |
| 2012/0233981 A1 | 9/2012 | Smith et al. |

(56) References Cited

U.S. PATENT DOCUMENTS

| | | |
|---|---|---|
| 2012/0233982 A1 | 9/2012 | Suciu et al. |
| 2012/0237334 A1 | 9/2012 | McCune et al. |
| 2012/0237336 A1 | 9/2012 | McCune et al. |
| 2012/0238401 A1 | 9/2012 | McCune et al. |
| 2012/0243971 A1 | 9/2012 | McCune et al. |
| 2012/0251306 A1 | 10/2012 | Reinhardt et al. |
| 2012/0255292 A1 | 10/2012 | Fong et al. |
| 2012/0257960 A1 | 10/2012 | Reinhardt et al. |
| 2012/0275904 A1 | 11/2012 | McCune et al. |
| 2012/0279198 A1 | 11/2012 | Erickson et al. |
| 2012/0291449 A1 | 11/2012 | Adams et al. |
| 2012/0292440 A1 | 11/2012 | Kosheleff |
| 2012/0315130 A1 | 12/2012 | Hasel et al. |
| 2012/0321476 A1 | 12/2012 | MacKie et al. |
| 2012/0328436 A1 | 12/2012 | Soidel et al. |
| 2013/0000314 A1* | 1/2013 | McCaffrey ............ F01D 13/003 60/773 |
| 2013/0004297 A1 | 1/2013 | Sheridan |
| 2013/0008144 A1 | 1/2013 | Gallagher et al. |
| 2013/0008146 A1 | 1/2013 | Gallagher et al. |
| 2013/0011261 A1 | 1/2013 | Boston et al. |
| 2013/0014488 A1 | 1/2013 | Gallagher et al. |
| 2013/0014489 A1 | 1/2013 | Suciu et al. |
| 2013/0014490 A1 | 1/2013 | Suciu et al. |
| 2013/0028733 A1 | 1/2013 | McCune |
| 2013/0067917 A1 | 3/2013 | Nagurney et al. |
| 2013/0068200 A1 | 3/2013 | Reynolds et al. |
| 2013/0074492 A1 | 3/2013 | Chi et al. |
| 2013/0074512 A1 | 3/2013 | Tillery |
| 2013/0081374 A1 | 4/2013 | Giffin et al. |
| 2013/0091852 A1 | 4/2013 | Wood et al. |
| 2013/0094937 A1 | 4/2013 | Glahn et al. |
| 2013/0094943 A1 | 4/2013 | Bouru et al. |
| 2013/0096786 A1 | 4/2013 | Jang |
| 2013/0098046 A1 | 4/2013 | Suciu et al. |
| 2013/0098050 A1 | 4/2013 | Kupratis |
| 2013/0098055 A1 | 4/2013 | Kupratis |
| 2013/0104560 A1 | 5/2013 | Kupratis |
| 2013/0125561 A1 | 5/2013 | Schwarz et al. |
| 2013/0139519 A1 | 6/2013 | Kesseli et al. |
| 2013/0145745 A1 | 6/2013 | Kohlenberg et al. |
| 2013/0149099 A1 | 6/2013 | Kohlenberg et al. |
| 2013/0149111 A1 | 6/2013 | Kohlenberg et al. |
| 2013/0149112 A1 | 6/2013 | Kohlenberg et al. |
| 2013/0149113 A1 | 6/2013 | Kohlenberg et al. |
| 2013/0163905 A1 | 6/2013 | Vintinner et al. |
| 2013/0186060 A1 | 7/2013 | Kosheleff |
| 2013/0186191 A1 | 7/2013 | Djelassi |
| 2013/0189117 A1 | 7/2013 | Baltas et al. |
| 2013/0192199 A1 | 8/2013 | Merry et al. |
| 2013/0192200 A1 | 8/2013 | Kupratis et al. |
| 2013/0192201 A1 | 8/2013 | Kupratis et al. |
| 2013/0192232 A1 | 8/2013 | Clemen |
| 2013/0192238 A1 | 8/2013 | Munsell et al. |
| 2013/0192239 A1 | 8/2013 | Glahn et al. |
| 2013/0192240 A1 | 8/2013 | Munsell et al. |
| 2013/0192241 A1 | 8/2013 | Blackwell et al. |
| 2013/0192242 A1 | 8/2013 | Davis et al. |
| 2013/0192247 A1 | 8/2013 | Blackwell et al. |
| 2013/0192248 A1 | 8/2013 | Ackermann et al. |
| 2013/0192250 A1 | 8/2013 | Glahn et al. |
| 2013/0192251 A1 | 8/2013 | Munsell et al. |
| 2013/0192252 A1 | 8/2013 | Ackermann et al. |
| 2013/0192253 A1 | 8/2013 | Ackermann et al. |
| 2013/0192256 A1 | 8/2013 | Suciu et al. |
| 2013/0192258 A1 | 8/2013 | Kupratis et al. |
| 2013/0192260 A1 | 8/2013 | Mayer et al. |
| 2013/0192261 A1 | 8/2013 | Mayer et al. |
| 2013/0192262 A1 | 8/2013 | Eastwood et al. |
| 2013/0192266 A1 | 8/2013 | Houston et al. |
| 2013/0192519 A1 | 8/2013 | Kim et al. |
| 2013/0195624 A1 | 8/2013 | Schwarz et al. |
| 2013/0195641 A1 | 8/2013 | Povey |
| 2013/0195645 A1 | 8/2013 | Suciu et al. |
| 2013/0195647 A1 | 8/2013 | Muldoon et al. |
| 2013/0199179 A1 | 8/2013 | Kitsukawa et al. |
| 2013/0202415 A1 | 8/2013 | Karl et al. |
| 2013/0209291 A1 | 8/2013 | Kitsukawa et al. |
| 2013/0216364 A1 | 8/2013 | Evans |
| 2013/0219856 A1 | 8/2013 | Suciu et al. |
| 2013/0219859 A1 | 8/2013 | Suciu et al. |
| 2013/0219860 A1 | 8/2013 | Suciu et al. |
| 2013/0219895 A1 | 8/2013 | Joshi et al. |
| 2013/0219908 A1 | 8/2013 | Schwarz et al. |
| 2013/0219922 A1 | 8/2013 | Gilson et al. |
| 2013/0220288 A1 | 8/2013 | Klingbeil |
| 2013/0223973 A1 | 8/2013 | Ali |
| 2013/0223977 A1 | 8/2013 | Ali |
| 2013/0223992 A1 | 8/2013 | Suciu et al. |
| 2013/0223993 A1 | 8/2013 | Merry et al. |
| 2013/0233970 A1 | 9/2013 | Cottet |
| 2013/0236296 A1 | 9/2013 | Collopy et al. |
| 2013/0239587 A1 | 9/2013 | Karl et al. |
| 2013/0255275 A1 | 10/2013 | Schwarz et al. |
| 2013/0259651 A1 | 10/2013 | Kupratis et al. |
| 2013/0259653 A1 | 10/2013 | Schwarz et al. |
| 2013/0263592 A1 | 10/2013 | Lotterman et al. |
| 2013/0269311 A1 | 10/2013 | Wichmann et al. |
| 2013/0269479 A1 | 10/2013 | Van Der Merwe |
| 2013/0276424 A1 | 10/2013 | Topol et al. |
| 2013/0277443 A1 | 10/2013 | Croll et al. |
| 2013/0280031 A1 | 10/2013 | Hurlin et al. |
| 2013/0283821 A1 | 10/2013 | Gilson et al. |
| 2013/0287581 A1 | 10/2013 | Aschermann et al. |
| 2013/0298522 A1 | 11/2013 | Eleftheriou et al. |
| 2013/0305714 A1 | 11/2013 | Rollinger et al. |
| 2013/0305731 A1 | 11/2013 | Morris et al. |
| 2013/0312419 A1 | 11/2013 | Merry et al. |
| 2013/0318939 A1 | 12/2013 | Parnin et al. |
| 2013/0318940 A1 | 12/2013 | Parnin et al. |
| 2013/0318988 A1 | 12/2013 | Robinson |
| 2013/0318998 A1 | 12/2013 | Schwarz et al. |
| 2013/0319010 A1 | 12/2013 | Hui et al. |
| 2013/0321824 A1 | 12/2013 | Hockaday |
| 2013/0323012 A1 | 12/2013 | Dong et al. |
| 2013/0323072 A1 | 12/2013 | Aschermann et al. |
| 2013/0334824 A1 | 12/2013 | Freda |
| 2013/0340406 A1 | 12/2013 | Gallagher et al. |
| 2013/0343876 A1 | 12/2013 | Leblanc et al. |
| 2013/0343896 A1 | 12/2013 | MacKie et al. |
| 2014/0000269 A1 | 1/2014 | Idahosa et al. |
| 2014/0003915 A1 | 1/2014 | Topol et al. |
| 2014/0007585 A1 | 1/2014 | Liu |
| 2014/0030087 A1 | 1/2014 | Soria et al. |
| 2014/0044540 A1 | 2/2014 | Uneura |
| 2014/0060075 A1 | 3/2014 | Glahn et al. |
| 2014/0061392 A1 | 3/2014 | Karem |
| 2014/0083107 A1 | 3/2014 | Sheridan et al. |
| 2014/0083115 A1 | 3/2014 | Von Nieda |
| 2014/0093350 A1 | 4/2014 | Meisner et al. |
| 2014/0096508 A1 | 4/2014 | McCune et al. |
| 2014/0096509 A1 | 4/2014 | Hasel |
| 2014/0096534 A1 | 4/2014 | Snape et al. |
| 2014/0102076 A1 | 4/2014 | Adams et al. |
| 2014/0109571 A1 | 4/2014 | Primus et al. |
| 2014/0112774 A1 | 4/2014 | Freeman et al. |
| 2014/0112784 A1 | 4/2014 | Pascal |
| 2014/0125121 A1 | 5/2014 | Edwards et al. |
| 2014/0130503 A1 | 5/2014 | Leep |
| 2014/0148928 A1 | 5/2014 | Stewart |
| 2014/0154064 A1 | 6/2014 | Bouteiller et al. |
| 2014/0157752 A1 | 6/2014 | Hasel et al. |
| 2014/0157753 A1 | 6/2014 | Hasel et al. |
| 2014/0157754 A1 | 6/2014 | Hasel et al. |
| 2014/0157755 A1 | 6/2014 | Hasel et al. |
| 2014/0157756 A1 | 6/2014 | Hasel et al. |
| 2014/0157757 A1 | 6/2014 | Hasel et al. |
| 2014/0165534 A1 | 6/2014 | Hasel et al. |
| 2014/0174055 A1 | 6/2014 | Adams |
| 2014/0174056 A1 | 6/2014 | Suciu et al. |
| 2014/0182309 A1 | 7/2014 | Ali |
| 2014/0186158 A1 | 7/2014 | Merry |
| 2014/0190163 A1 | 7/2014 | Maier |
| 2014/0191088 A1 | 7/2014 | Karem |

(56) References Cited

U.S. PATENT DOCUMENTS

| | | |
|---|---|---|
| 2014/0193238 A1 | 7/2014 | Sheridan et al. |
| 2014/0195134 A1 | 7/2014 | Maier |
| 2014/0196470 A1 | 7/2014 | Glahn et al. |
| 2014/0196472 A1 | 7/2014 | Kupratis et al. |
| 2014/0196473 A1 | 7/2014 | Kupratis et al. |
| 2014/0202133 A1 | 7/2014 | Praisner et al. |
| 2014/0205438 A1 | 7/2014 | Hasel |
| 2014/0205439 A1 | 7/2014 | Merry et al. |
| 2014/0205457 A1 | 7/2014 | Curlier et al. |
| 2014/0216003 A1 | 8/2014 | Phillips et al. |
| 2014/0216004 A1 | 8/2014 | Munsell et al. |
| 2014/0219783 A1 | 8/2014 | Coffin et al. |
| 2014/0234078 A1 | 8/2014 | Sheridan et al. |
| 2014/0234089 A1 | 8/2014 | Moradell-Casellas et al. |
| 2014/0245749 A1 | 9/2014 | Mercier et al. |
| 2014/0248116 A1 | 9/2014 | Ali |
| 2014/0248129 A1 | 9/2014 | Merry et al. |
| 2014/0260326 A1 | 9/2014 | Schwarz et al. |
| 2014/0263712 A1 | 9/2014 | Froemming et al. |
| 2014/0270605 A1 | 9/2014 | Rosen et al. |
| 2014/0271112 A1 | 9/2014 | Morin et al. |
| 2014/0271135 A1 | 9/2014 | Sheridan et al. |
| 2014/0277991 A1 | 9/2014 | Skertic et al. |
| 2014/0283500 A1 | 9/2014 | Sabnis |
| 2014/0290211 A1 | 10/2014 | Kupratis et al. |
| 2014/0301829 A1 | 10/2014 | Reinhardt et al. |
| 2014/0301837 A1 | 10/2014 | Dezeustre et al. |
| 2014/0308123 A1 | 10/2014 | Nussenblatt et al. |
| 2014/0314541 A1 | 10/2014 | Schwarz et al. |
| 2014/0326826 A1 | 11/2014 | Certain |
| 2015/0337901 A1 | 11/2015 | Hayashi et al. |

FOREIGN PATENT DOCUMENTS

| | | |
|---|---|---|
| CA | 2403632 A1 | 3/2004 |
| CA | 2798211 A1 | 6/2013 |
| CA | 2917362 A1 | 1/2015 |
| CN | 102220904 A | 10/2011 |
| CN | 102483038 A | 5/2012 |
| EP | 0992696 A1 | 4/2000 |
| EP | 1254831 A1 | 11/2002 |
| EP | 1340902 A2 | 9/2003 |
| EP | 1619391 A2 | 1/2006 |
| EP | 2009246 A2 | 12/2008 |
| EP | 2607231 A2 | 6/2013 |
| FR | 2964942 A1 | 3/2012 |
| GB | 1418905 | 12/1975 |
| GB | 2218747 A | 11/1989 |
| GB | 2226087 A | 6/1990 |
| JP | 50124011 A | 9/1975 |
| JP | 61275550 A | 12/1986 |
| JP | 1314696 A | 12/1989 |
| JP | 02024293 A | 1/1990 |
| JP | 02179598 A | 7/1990 |
| JP | 02238160 A | 9/1990 |
| JP | 02245455 A | 10/1990 |
| JP | 05149328 A | 6/1993 |
| JP | 05149329 A | 6/1993 |
| JP | 05164132 A | 6/1993 |
| JP | 2006046322 A | 2/2006 |
| JP | 2007192315 A | 8/2007 |
| JP | 2008519229 A | 6/2008 |
| JP | 2009115139 A | 5/2009 |
| JP | 2010001992 A | 1/2010 |
| JP | 2012521516 A | 9/2012 |
| JP | 2013523526 A | 6/2013 |
| JP | 2013256397 A | 12/2013 |
| JP | 2014088893 A | 5/2014 |
| JP | 2014152788 A | 8/2014 |
| JP | 2014520035 A | 8/2014 |
| JP | 2014173635 A | 9/2014 |
| JP | 2015059645 A | 3/2015 |
| WO | 2006080055 A1 | 8/2006 |
| WO | 2008117413 A1 | 10/2008 |
| WO | 2013141935 A1 | 9/2013 |

OTHER PUBLICATIONS

European Search Report and Opinion issued in connection with related EP Application No. 15168754.8 dated Oct. 29, 2015.

Canadian Office Action issued in connection with related CA Application No. 2891864 dated May 16, 2016.

Unofficial English Translation of Japanese Office Action issued in connection with related JP Application No. 2015105048 dated May 31, 2016.

European Search Report and Opinion issued in connection with related EP Application No. 16163745.9 dated Sep. 13, 2016.

Unofficial English Translation of Japanese Notice of Allowance issued in connection with related JP Application No. 2015105048 dated Dec. 20, 2016.

Unofficial English Translation of Japanese Search Report issued in connection with related JP Application No. 2016066996 dated Feb. 8, 2017.

Unofficial English Translation of Japanese Office Action issued in connection with related JP Application No. 2016066996 dated Feb. 21, 2017.

Canadian Office Action issued in connection with related CA Application No. 2924931 dated Feb. 27, 2017.

European Search Report and Opinion issued in connection with related EP Application No. 16192205.9 dated Mar. 2, 2017.

Canadian Office Action issued in connection with related CA Application No. 2891864 dated Mar. 21, 2017.

US Non Final Rejection issued in connection with related U.S. Appl. No. 14/708,353 dated May 24, 2017.

Chinese Office Action issued in connection with related CN Application No. 201510285220.8 dated Jun. 2, 2017.

Japanese Notice of Allowance issued in connection with related JP Application No. 2016066996 dated Jul. 4, 2017.

\* cited by examiner

VARIABLE PITCH FAN FOR GAS TURBINE ENGINE AND METHOD OF ASSEMBLING THE SAME

CROSS-REFERENCE TO RELATED APPLICATIONS

This non-provisional application claims the benefit of priority under 35 U.S.C. § 119(e) to U.S. Provisional Patent Application No. 62/082,875, entitled "VARIABLE PITCH FAN FOR GAS TURBINE ENGINE AND METHOD OF ASSEMBLING THE SAME", filed Nov. 21, 2014, which is herein incorporated in its entirety by reference.

BACKGROUND

The field of this disclosure relates generally to a gas turbine engine and, more particularly, to a gas turbine engine having a variable pitch fan.

Conventional gas turbine engines include a fan and a core arranged in flow communication with one another. The fan provides air to the core, and the core compresses the air provided by the fan and subsequently mixes it with fuel for igniting the mixture to generate a flow of combustion gas through a turbine. The combustion gas powers the turbine, which in turn drives the fan to generate thrust for the engine.

At least some known gas turbine engines utilize a variable pitch fan. However, the mechanical components associated with varying the pitch of the fan blades can result in the rotating nacelle of the engine being quite large, and a larger rotating nacelle can lower the efficiency of the airflow provided to the core. More specifically, in many known engines, the minimum size of the rotating nacelle is typically dictated by the number and/or length of the fan blades, and the componentry for varying the pitch of the fan blades tends to grow the rotating nacelle from such a minimum size. It is therefore desirable to configure a variable pitch fan with a more compact componentry for varying the pitch of the fan blades, thereby enabling the engine to have a smaller rotating nacelle, a higher fan blade count, and a lower fan blade length.

BRIEF DESCRIPTION OF THE INVENTION

In one aspect, a gas turbine engine is provided. The gas turbine engine includes a core and a variable pitch fan arranged in flow communication with the core. The variable pitch fan has a disk and at least nine fan blades coupled to the disk for rotation together with the disk. The gas turbine engine further includes a rotatable nacelle covering the disk such that the engine has a fan hub radius ratio of between about 0.1 and about 0.4.

In another aspect, a method of assembling a gas turbine engine is provided. The method includes providing a core and coupling a variable pitch fan to a turbine that is configured to be powered by combustion gas from the core. The variable pitch fan includes a disk and at least nine fan blades coupled to the disk for rotation together with the disk. The method further includes covering the disk with a rotatable nacelle such that the engine has a fan hub radius ratio of between about 0.1 and about 0.4.

In another aspect, a gas turbine engine is provided. The gas turbine engine includes a core and a variable pitch fan arranged in flow communication with the core. The variable pitch fan has a disk and at least nine fan blades each coupled to the disk via a trunnion mechanism for rotation together with the disk. The trunnion mechanism includes a pair of line contact bearings. The gas turbine engine further includes an actuation mechanism for varying a pitch of the fan blades, and one of a remote counterweight device and a remote pitch lock device operatively coupled to the fan blades via the actuation mechanism. The gas turbine engine also includes a plurality of outlet guide vanes aft of the fan, and a rotatable nacelle covering the disk such that the engine has a fan hub radius ratio of between about 0.1 and about 0.4.

DETAILED DESCRIPTION OF THE INVENTION

The following detailed description sets forth a variable pitch fan for a gas turbine engine and a method of fabricating the same by way of example and not by way of limitation. The description should clearly enable one of ordinary skill in the art to make and use the variable pitch fan, and the description sets forth several embodiments, adaptations, variations, alternatives, and uses of the variable pitch fan, including what is presently believed to be the best mode thereof. The variable pitch fan is described herein as being applied to a preferred embodiment, namely a gas turbine engine. However, it is contemplated that the variable pitch fan may have general application in a broad range of systems and/or a variety of commercial, industrial, and/or consumer applications other than gas turbine engines.

Figure 1:
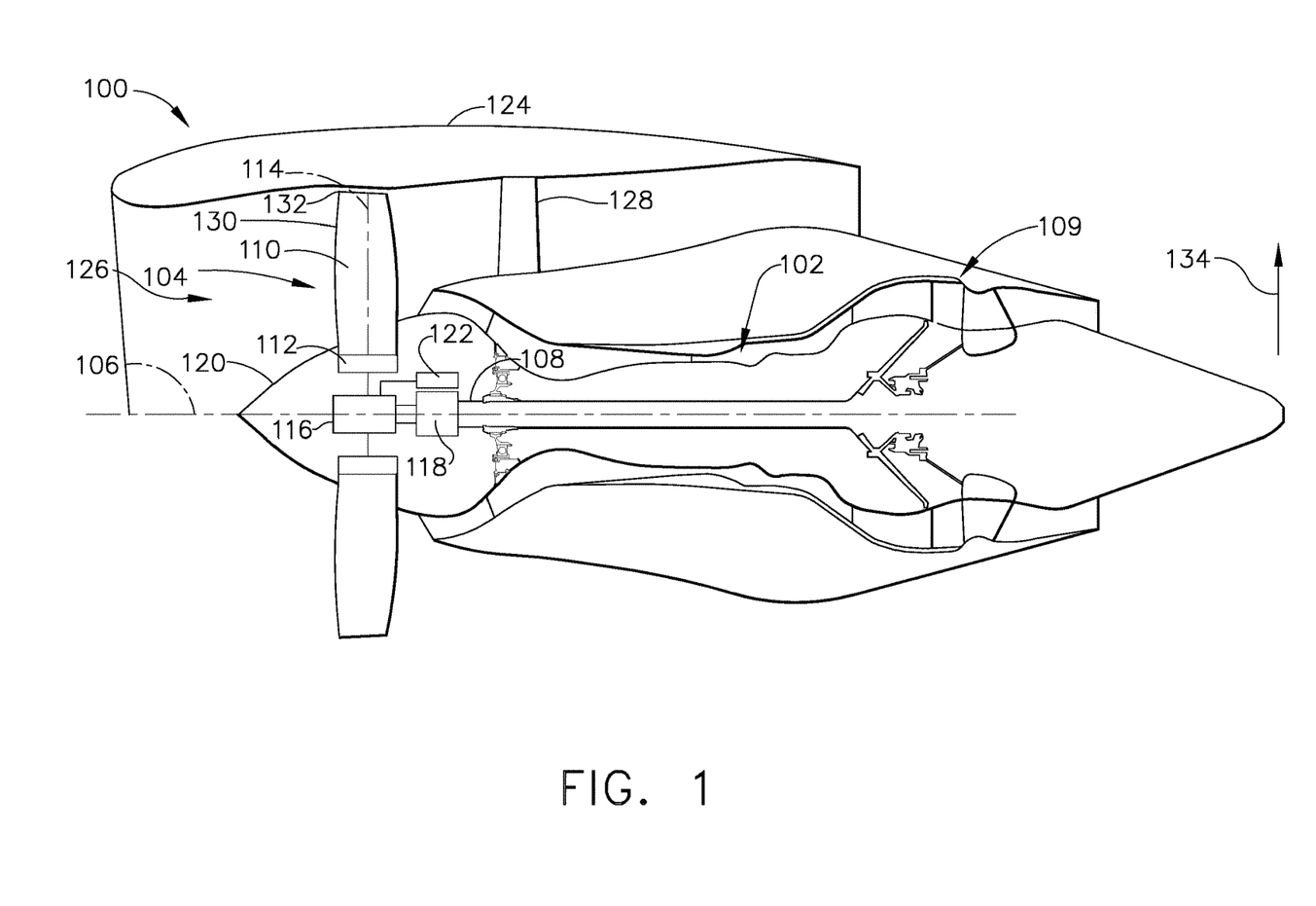
FIG. 1 is a schematic representation of a gas turbine engine with the top half representing a ducted gas turbine engine and the bottom half representing an unducted gas turbine engine.

FIG. 1 illustrates a gas turbine engine 100 of the exemplary embodiment. Gas turbine engine 100 includes a core 102 and a fan 104 in flow communication with core 102 along a centerline axis 106 of engine 100. Fan 104 is driven by a spool 108 operatively coupled to a turbine 109 that is configured to be powered by combustion gas from core 102. Notably, fan 104 is a variable pitch fan having a plurality of fan blades 110 coupled to a disk 112 so as to be spaced along disk 112 and extend outwardly from disk 112 generally in a radial direction 134. Each fan blade 110 is rotatable relative to disk 112 about a pitch axis 114 by virtue of fan blades 110 being operatively coupled to a suitable actuation mechanism 116 configured to collectively vary the pitch of fan blades 110 in unison. Furthermore, actuation mechanism 116, disk 112, and fan blades 110 are together rotatable about engine centerline axis 106 by spool 108 across a gear box 118 that steps down the rotational speed of spool 108. In this manner, disk 112 is covered by a rotatable nacelle 120 aerodynamically contoured to promote airflow through fan blades 110 and into core 102. Optionally, fan 104 in some embodiments may be surrounded by a fan cowl 124 that defines a bypass duct 126 for air flowing through fan 104. Moreover, engine 100 may in some embodiments include a plurality of outlet guide vanes (OGVs) 128 aft of fan 104 to facilitate modifying (e.g., swirling) the airflow discharged from fan 104.

Additionally, fan blades 110 are operatively coupled to a pitch correction device (e.g., a counterweight device 122, or a suitable pitch lock device) across actuation mechanism 116 such that the pitch correction device is said to be remote from (i.e., not coupled directly to) fan blades 110. Notably, the pitch correction device is suitably configured to drive the pitch of fan blades 110 to a predetermined pitch angle in the event that actuation system 116 is no longer operable for controlling the pitch of fan blades 110. For example, in the exemplary embodiment, counterweight device 122 is configured to pitch fan blades 110 such that fan 104 continues to absorb power generated by turbine 109, rather than unloading turbine 109, in the event that actuation mechanism 116 is no longer operable for controlling the pitch of fan blades 110. Counterweight device 122 may have any suitable configuration that facilitates enabling counterweight device 122 to function as described herein (e.g., to not be coupled directly to fan blades 110).

Notably, the efficiency of air flowing over rotatable nacelle 120 and into core 102 can be affected by the overall size of rotatable nacelle 120 (e.g., the radial dimension of rotatable nacelle 120). More specifically, a fan hub radius ratio parameter of engine 100 is directly correlated with the efficiency by which air flows over rotatable nacelle 120 and into core 102 (i.e., as the fan hub radius ratio increases, airflow over rotatable nacelle 120 and into core 102 becomes more difficult and, therefore, less efficient; and, as the fan hub radius ratio decreases, airflow over rotatable nacelle 120 and into core 102 becomes easier and, therefore, more efficient). The fan hub radius ratio is defined herein as the ratio of the radius of rotatable nacelle 120 from engine centerline axis 106 at blade leading edge 130 over the radius of blade tip 132 from engine centerline axis 106 at blade leading edge 130.

In that regard, it is desirable to decrease the fan hub radius ratio in order to make the airflow over rotatable nacelle 120 and into core 102 more efficient. As such, because rotatable nacelle 120 houses disk 112, the size of rotatable nacelle 120 (e.g., the radial dimension of rotatable nacelle 120) is in part dictated by the size of disk 112 (e.g., the radial dimension of disk 112). Thus, it is desirable to reduce the radius of disk 112 in order to facilitate reducing the radius of rotatable nacelle 120 and, hence, the fan hub radius ratio. In the exemplary embodiment, the fan hub radius ratio for engine 100 is below about 0.4. In one suitable embodiment, the fan hub radius ratio is between about 0.1 and about 0.4. In another suitable embodiment, the fan hub radius ratio is between about 0.2 and about 0.35. In yet another suitable embodiment, the fan hub radius ratio is between about 0.2 and about 0.3.

Figure 2:
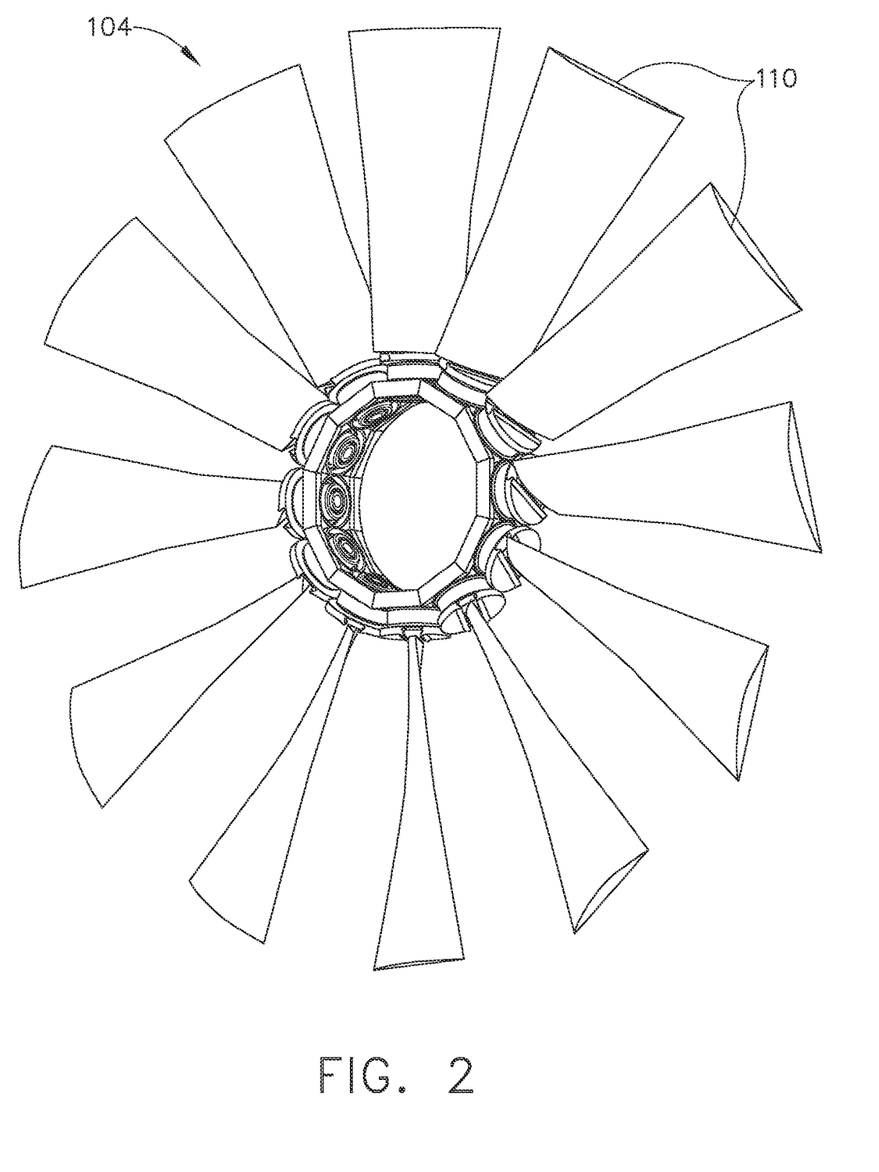
FIG. 2 is a perspective view of a variable pitch fan of the gas turbine engine shown in FIG. 1.

FIG. 2 illustrates an exemplary embodiment of fan 104. In the exemplary embodiment, fan 104 includes twelve fan blades 110. From a loading standpoint, such a blade count enables the span of each fan blade 110 to be reduced such that the overall diameter of fan 104 is also able to be reduced (e.g., to about twelve feet in the exemplary embodiment). That said, in other embodiments, fan 104 may have any suitable blade count and any suitable diameter. For example, in one suitable embodiment, fan 104 may have at least 9 fan blades 110. In another suitable embodiment, fan 104 may have at least 12 fan blades 110. In yet another suitable embodiment, fan 104 may have at least 15 fan blades 110. In yet another suitable embodiment, fan 104 may have at least 18 fan blades 110.

Notably, in the exemplary embodiment, engine 100 is able to be provided with such a combination of a lower fan hub radius ratio, a higher fan blade count, and a lower fan diameter by virtue of at least the following two contributing factors: (1) as set forth in more detail below, the attachment of each fan blade 110 to disk 112 has been made more compact, thereby enabling more fan blades 110 to be arranged on disk 112 with little increase to the diameter of disk 112; and (2) as set forth above, each fan blade 110 is not provided with its own dedicated counterweight mechanism attached thereto but, instead, a remote counterweight device 122 is operatively coupled to fan blades 110 through actuation mechanism 116, meaning that counterweight device 122 is located away from fan blades 110 and disk 112 so as to not crowd the available space near disk 112 and, hence, enable a smaller diameter of disk 112.

Figure 3:
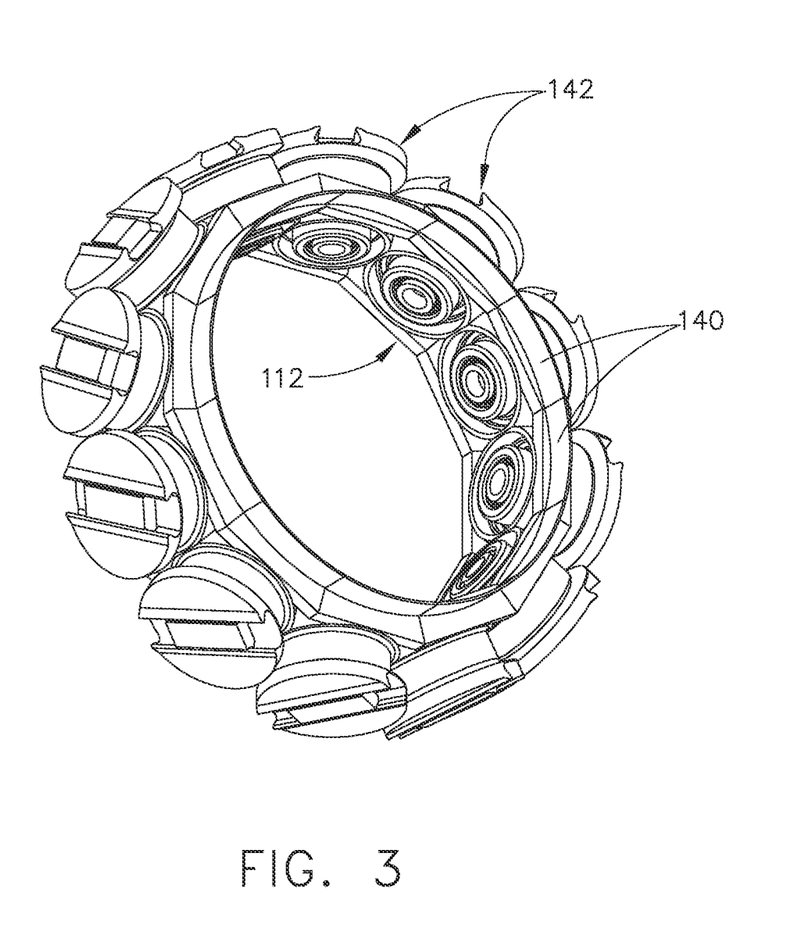
FIG. 3 is a perspective view of a disk and associated trunnion mechanisms of the variable pitch fan shown in FIG. 2.
Figure 4:
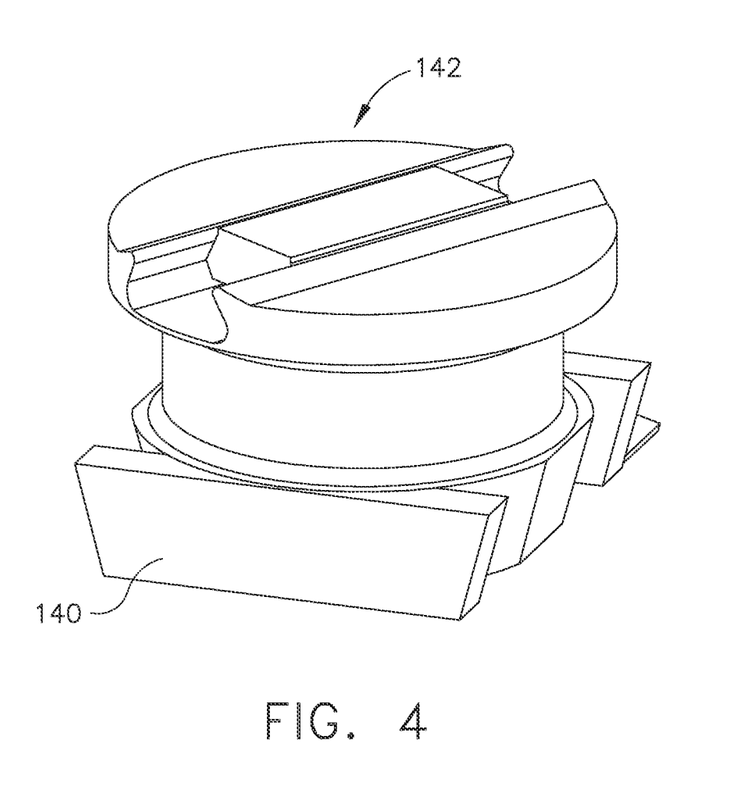
FIG. 4 is a perspective view of a segment of the disk and one of the associated trunnion mechanisms shown in FIG. 3.
Figure 5:
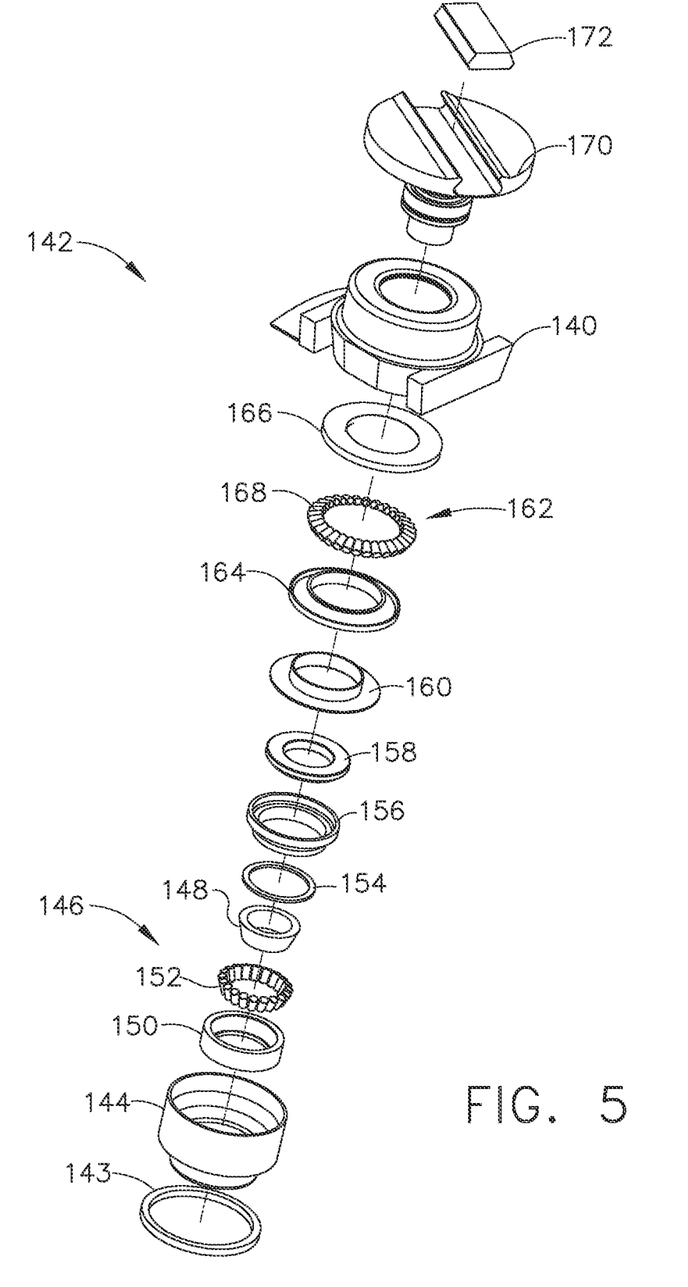
FIG. 5 is an exploded view of the trunnion mechanism shown in FIG. 4.
Figure 6:
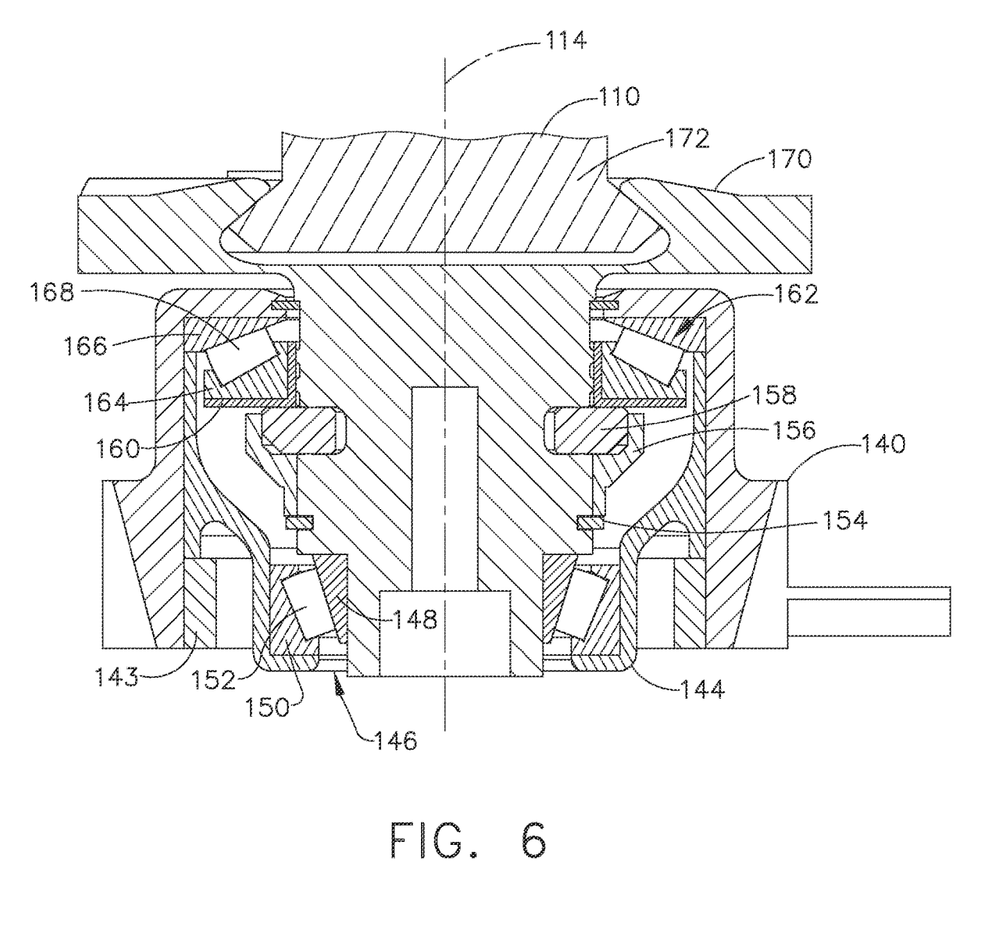
FIG. 6 is a cross-sectional view of the segment of the disk and the trunnion mechanism shown in FIG. 4 with a blade attached to the trunnion mechanism.
Figure 7:
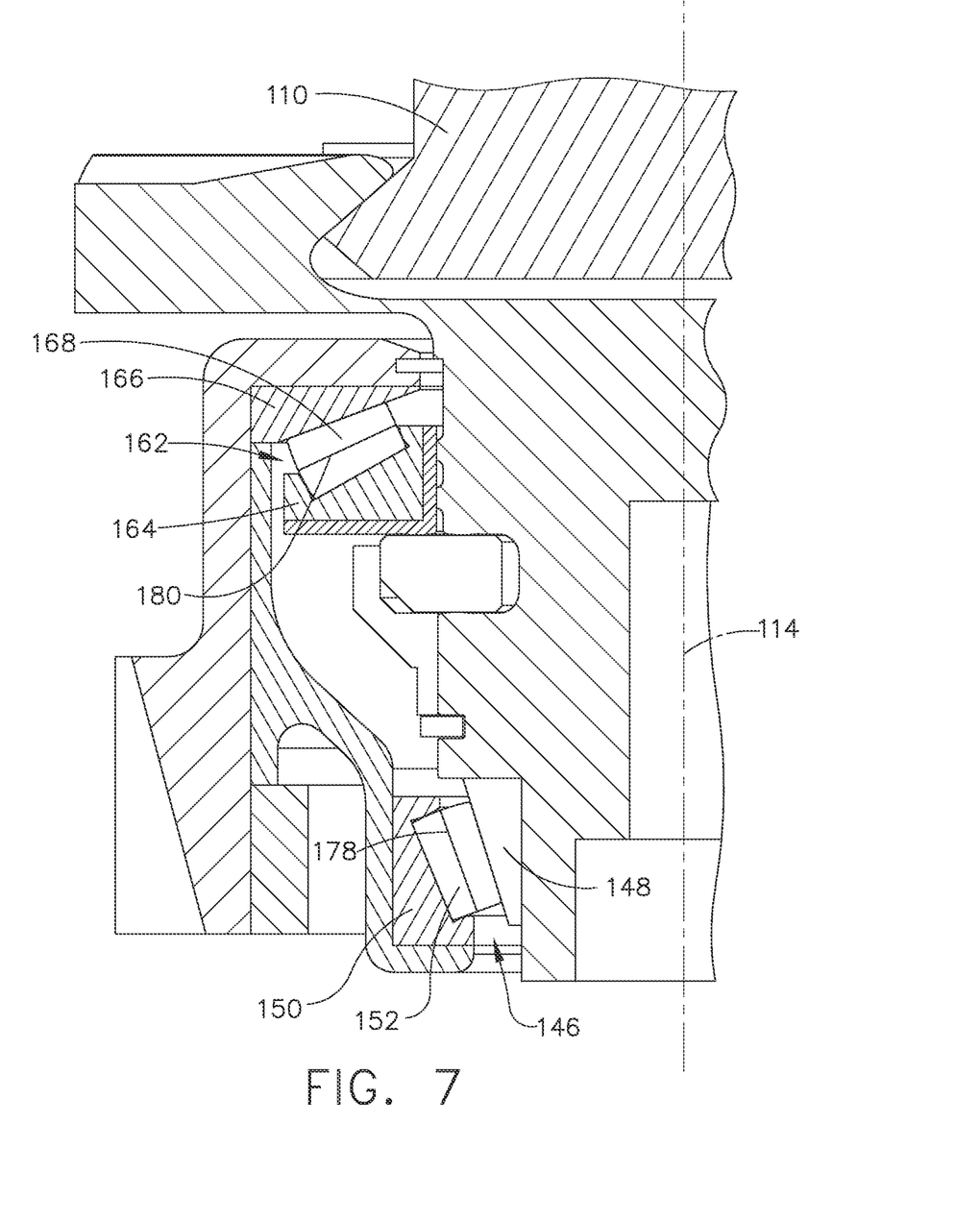
FIG. 7 is an enlarged segment of the cross-sectional view shown in FIG. 6.

FIG. 3 illustrates an exemplary embodiment of disk 112. Notably, disk 112 includes a plurality of disk segments 140 that are rigidly coupled together or integrally molded together in a generally annular shape (e.g., a polygonal shape). One fan blade 110 is to be coupled to each disk segment 140 at a trunnion mechanism 142 that facilitates retaining its associated fan blade 110 on disk 112 during rotation of disk 112 (i.e., trunnion mechanism 142 facilitates providing a load path to disk 112 for the centrifugal load generated by fan blades 110 during rotation about engine centerline axis 106), while rendering its associated fan blade 110 rotatable relative to disk 112 about pitch axis 114. Notably, the size and configuration of each trunnion mechanism 142 directly influences the diameter of disk 112. Particularly, larger trunnion mechanisms 142 tend to occupy larger circumferential segments of disk 112 and, hence, tend to result in a larger diameter of disk 112. On the other hand, smaller trunnion mechanisms 142 tend to occupy smaller circumferential segments of disk 112 and, hence, tend to result in a smaller diameter of disk 112.

FIGS. 4-7 illustrate one such disk segment 140 and trunnion mechanism 142. In the exemplary embodiment, each trunnion mechanism 142 extends through its associated disk segment 140 and includes: a coupling nut 143; a lower bearing support 144; a first line contact bearing 146 (having, for example, an inner race 148, an outer race 150, and a plurality of rollers 152); a snap ring 154; a key hoop retainer 156; a segmented key 158; a bearing support 160; a second line contact bearing 162 (having, for example, an inner race 164, an outer race 166, and a plurality of rollers 168); a trunnion 170; and a dovetail 172. For use as bearings 146, 162, at least the following types of line contacting type rolling element bearings are contemplated: cylindrical roller bearings; cylindrical roller thrust bearings; tapered roller bearings; spherical roller bearings; spherical roller thrust bearings; needle roller bearings; and tapered roller needle bearings. When assembled, coupling nut 143 is threadably engaged with disk segment 140 so as to sandwich the remaining components of trunnion mechanism 142 between coupling nut 143 and disk segment 140, thereby retaining trunnion mechanism 142 attached to disk segment 140.

In the exemplary embodiment, first line contact bearing 146 is oriented at a different angle than second line contact bearing 162 (as measured from a centerline axis 178 of rollers 152 relative to pitch axis 114, and from a centerline axis 180 of rollers 168 relative to pitch axis 114). More specifically, line contact bearings 146, 162 are preloaded against one another in a face-to-face (or duplex) arrangement, wherein centerline axes 178, 180 are oriented substantially perpendicular to one another, as opposed to being arranged in tandem so as to be oriented substantially parallel to one another.

Notably, the centrifugal loads experienced closer to pitch axis 114 are larger than those experienced further away from pitch axis 114. As such, to facilitate making trunnion mechanism 142 more compact, it is desirable to locate its associated bearings closer to pitch axis 114, thereby enabling more trunnion mechanisms 142 to be assembled on disk 112 and, hence, more fan blades 110 to be coupled to disk 112 for any given diameter of disk 112. By providing each trunnion mechanism 142 with the configuration of the exemplary embodiment (e.g., by providing trunnion mechanism 142 with line contact bearings 146, 162, as opposed to angular point contact ball bearings), trunnion mechanism 142 is able to be made more compact because line contact bearings 146, 162 are better able to withstand larger centrifugal loads without fracturing or plastically deforming. More specifically, line contact bearings 146, 162 have larger contact surfaces and, therefore, can withstand larger centrifugal loads than point contact ball bearings, for example. Thus, line contact bearings 146, 162 can be spaced closer to pitch axis 114 than point contact ball bearings.

In one suitable embodiment, first line contact bearing 146 is fabricated from a steel material and has 20 rollers 152 arranged at a 20° contact angle and a 3.6" pitch diameter, with each roller 152 being 0.6" long and having a 0.525" minor diameter, a 0.585" major diameter, and a 6° taper angle. Moreover, in the same embodiment, second line contact bearing 162 is fabricated from a steel material and has 36 rollers 168 arranged at a 65° contact angle and a 6" pitch diameter, with each roller 168 being 0.8" long and having a 0.45" minor diameter, a 0.6" major diameter, and a 9° taper angle. In other embodiments, roller bearings 146, 162 may be configured in any suitable manner that facilitates enabling roller bearings 146, 162 to function as described herein.

The above-described embodiments facilitate providing a gas turbine engine with a smaller variable pitch fan that can generate larger amounts of thrust. Particularly, the embodiments facilitate providing a gas turbine engine with a variable pitch fan having a higher blade count and a lower blade length, while also providing the gas turbine engine with a lower fan hub radius ratio. The embodiments further facilitate providing a trunnion mechanism that is more compact and is better able to withstand the higher centrifugal loads associated with higher blade counts, given that higher blade counts tend to yield a higher tip velocity and, therefore, a higher centrifugal loading. The embodiments further facilitate providing a smaller diameter disk for a variable pitch fan by providing the variable pitch fan with a remote counterweight device for the fan blades.

Exemplary embodiments of a variable pitch fan and a method of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A gas turbine engine comprising:
   a core;
   a variable pitch fan arranged in flow communication with said core, said variable pitch fan comprising a polygonal-shaped disk, said disk comprising a plurality of segments and a plurality of fan blades coupled to said disk for rotation together with said disk, each discrete portion of said disk comprising a single segment of the plurality of segments and a single fan blade of the plurality of fan blades;
   a trunnion mechanism coupling each of said fan blades to the respective segment of said disk such that said fan blades are rotatable relative to said disk about a pitch axis; and
   a rotatable nacelle covering said disk such that said gas turbine engine has a fan hub radius ratio of between 0.1 and 0.4.

2. The gas turbine engine in accordance with claim 1, wherein said fan hub radius ratio is between 0.2 and 0.35.

3. The gas turbine engine in accordance with claim 1, wherein said fan hub radius ratio is between 0.2 and 0.3.

4. The gas turbine engine in accordance with claim 1, wherein each of said trunnion mechanisms comprises a line contact bearing.

5. The gas turbine engine in accordance with claim 4, wherein said trunnion mechanism comprises a first line contact bearing and a second line contact bearing, wherein said first line contact bearing is oriented at a different angle than said second line contact bearing relative to the pitch axis.

6. The gas turbine engine in accordance with claim 1, further comprising:
   an actuation mechanism for varying a pitch of said fan blades; and
   a pitch correction device operatively coupled to said fan blades via said actuation mechanism.

7. The gas turbine engine in accordance with claim 6, wherein said pitch correction device is one of a remote counterweight device and a remote pitch lock device.

8. The gas turbine engine in accordance with claim 1, further comprising a fan cowl surrounding said fan to form a bypass duct.

9. The gas turbine engine in accordance with claim 1, wherein said variable pitch fan is unducted.

10. The gas turbine engine in accordance with claim 1, further comprising a plurality of outlet guide vanes aft of said variable pitch fan.

11. A method of assembling a gas turbine engine, said method comprising:
    providing a core;
    combining a plurality of segments to form a polygonal-shaped disk;
    coupling a variable pitch fan to a turbine that is configured to be powered by combustion gas from the core, the variable pitch fan including the disk and a plurality of fan blades coupled to the disk for rotation together with the disk, each discrete portion of the disk comprising a single segment of the plurality of segments and a single fan blade of the plurality of fan blades; and
    covering the disk with a rotatable nacelle such that the gas turbine engine has a fan hub radius ratio of between 0.1 and 0.4,
    wherein coupling said variable pitch fan to said turbine comprises coupling each of the fan blades to respective segments of the disk via a trunnion mechanism such that each of the fan blades is rotatable relative to the disk about a pitch axis.

12. The method in accordance with claim 11, wherein each of the trunnion mechanisms has a first line contact bearing and a second line contact bearing that is oriented at a different angle than the first line contact bearing relative to the pitch axis.

13. The method in accordance with claim 12, further comprising providing each of the line contact bearings with a different number of rollers.

14. The method in accordance with claim 11, further comprising:
    coupling an actuation mechanism to the fan blades, wherein the actuation system is configured for varying a pitch of the fan blades; and
    coupling one of a remote counterweight device and a remote pitch lock device to the fan blades via the actuation mechanism.

15. The method in accordance with claim 11, further comprising surrounding the variable pitch fan with a fan cowl to form a bypass duct.

16. The method in accordance with claim 11, further comprising providing the variable pitch fan as an unducted fan.

17. The method in accordance with claim 11, further comprising mounting a plurality of outlet guide vanes aft of the variable pitch fan.

18. A gas turbine engine comprising a core;
    a variable pitch fan arranged in flow communication with said core, said variable pitch fan comprising a polygonal-shaped disk said disk comprising a plurality of segments and a plurality of fan blades each coupled to a respective segment of said disk via a trunnion mechanism for rotation together with said disk, each discrete portion of the disk comprising a single segment of the plurality of segments and a single fan blade of the plurality of fan blades, said trunnion mechanism comprising a pair of line contact bearings; an actuation mechanism for varying a pitch of said fan blades;
    one of a remote counterweight device and a remote pitch lock device operatively coupled to said fan blades via said actuation mechanism;
    a plurality of outlet guide vanes aft of said variable pitch fan; and a rotatable nacelle covering said disk such that said gas turbine engine has a fan hub radius ratio of between 0.1 and 0.4.

* * * * *